United States Patent
Schanel et al.

(10) Patent No.: US 6,304,272 B1
(45) Date of Patent: Oct. 16, 2001

(54) GRAPHICS SYSTEM AND METHOD HAVING OBJECTS CONFORMED TO A TEMPLATE

(75) Inventors: Scott J. Schanel; Peter F. Sovocool, both of San Francisco, CA (US)

(73) Assignee: Micrografx, Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/763,163

(22) Filed: Dec. 10, 1996

(51) Int. Cl.[7] .................................................. G06T 15/00
(52) U.S. Cl. ............................................................ 345/438
(58) Field of Search ..................... 345/438, 342, 345/440

(56) References Cited

U.S. PATENT DOCUMENTS

| | | | |
|---|---|---|---|
| 4,710,885 | 12/1987 | Litteken | 364/518 |
| 4,875,187 | 10/1989 | Smith | 364/900 |
| 4,891,770 | 1/1990 | Hollett | 364/521 |
| 5,021,974 | 6/1991 | Pisculli et al. | 364/518 |
| 5,025,396 | 6/1991 | Parks et al. | 364/518 |
| 5,204,946 | 4/1993 | Shimamura | 395/146 |
| 5,214,755 * | 5/1993 | Mason | 707/520 |
| 5,278,950 | 1/1994 | Takei et al. | 395/134 |
| 5,317,646 * | 5/1994 | Sang, Jr. et al. | 382/175 |
| 5,416,900 * | 5/1995 | Blanchard et al. | 395/155 |
| 5,426,725 | 6/1995 | Kilgore | 395/147 |
| 5,452,409 | 9/1995 | Smith | 395/140 |
| 5,459,825 * | 10/1995 | Anderson et al. | 345/433 |
| 5,459,826 | 10/1995 | Archibald | 395/147 |
| 5,493,639 | 2/1996 | Hirano et al. | 395/141 |
| 5,515,496 * | 5/1996 | Kaehler et al. | 345/334 |
| 5,544,301 * | 8/1996 | Orton et al. | 345/342 |
| 5,555,369 * | 9/1996 | Menendez et al. | 345/334 |
| 5,581,670 * | 12/1996 | Bier et al. | 345/326 |
| 5,588,108 * | 12/1996 | Kumar et al. | 345/348 |
| 5,617,114 * | 4/1997 | Bier et al. | 345/113 |
| 5,649,133 * | 7/1997 | Arquie | 345/348 |
| 5,704,028 * | 12/1997 | Schanel et al. | 345/440 |
| 5,704,050 * | 12/1997 | Redpath | 345/339 |
| 5,745,122 * | 4/1998 | Gay et al. | 345/433 |
| 5,808,610 * | 9/1998 | Benson et al. | 345/342 |

FOREIGN PATENT DOCUMENTS

| | | | |
|---|---|---|---|
| 0715281 | 2/1991 | (EP) | G06T/17/40 |
| 9610231 | 4/1996 | (WO) | G06F/15/00 |

OTHER PUBLICATIONS

Microsoft Press Computer Dictionary (3rd Edition), p. 166, 1997.*

Robert Cowart, "Mastering Windows 3.1 Special Edition," Chapter 19 Troubleshooting, SYBEX Inc., 1993, p. 662.

* cited by examiner

Primary Examiner—Cliff N. Vo
(74) Attorney, Agent, or Firm—Baker Botts L.L.P.

(57) ABSTRACT

A computer graphics program embodied in a computer-readable medium displays a template having a boundary and a plurality of regions, displays an object that can be associated with the template, and moves the object with respect to the template in response to a user command. The program may detect the proximity of the object to a region of the template and display the object in the region using an adjustment while the object is detected in the proximity of the region. Also, the program may modify the shape of a region in response to movement of a region control point located within the boundary of the template and conform an object associated with the region with the modification to the region. Further, the program may modify the template and its regions in response to movement of a two axes template control point and conform an object associated with a region in response to the modification to the region.

21 Claims, 6 Drawing Sheets

GRAPHICS SYSTEM AND METHOD HAVING OBJECTS CONFORMED TO A TEMPLATE

TECHNICAL FIELD OF THE INVENTION

This invention relates to the field of computer graphics systems, and more particularly, to a graphics system and method having objects conformed to a template.

BACKGROUND OF THE INVENTION

As people and organizations are confronted with more and more information, the ability to visually illustrate and present information becomes critical. Existing graphics applications include a computer and display or other output device to generate diagrams, charts, or illustrations that include text, lines, shapes, and other visual features.

Many of these graphics applications include helpful aids to allow the user to quickly and efficiently create structured diagrams and charts. For example, some existing applications present the user with grids and rulers to aid in the alignment and placement of objects in a diagram. These alignment tools or guides may not be modifiable, and typically operate in traditional orthogonal coordinate systems. Also, charts created using these guides disperse most, if not all, of the graphics data among the individual objects that comprise the chart.

SUMMARY OF THE INVENTION

In accordance with the present invention, a graphics system and method are provided that substantially eliminate or reduce disadvantages or problems associated with previously developed graphics systems and methods. In particular, a template provides a flexible and modifiable guide to conform objects in a structured chart.

In one embodiment of the present invention, a graphics program executed by a computer having a display includes a number of objects and a template having a boundary and a plurality of regions defined in part by the boundary. An adjustment method generates an adjustment to conform each object to an associated region of the template.

In another embodiment of the present invention, a computer program operable to execute on a computer having a display includes a graphics application that generates a number of objects. The program also includes a template interface that generates a template having a boundary and a number of regions defined in part by the boundary. The interface generates an adjustment to conform each object generated by the application to an associated region of the template.

Technical advantages of the present invention include a flexible and modifiable guide in the form of a template that organizes, conforms, and displays a number of objects in a structured chart. Each object may be placed in and conformed to an associated region in the template. As each object is placed in its associated region, the template or template interface generates adjustments that move, scale, rotate, shear, formfit, or perform other modifications to conform the object to an associated region.

Another important technical advantage of the present invention includes the generation and maintenance of adjustments to the objects. In existing graphics systems, the individual objects maintain much of the graphics data or other information that determines the structure and organization of a chart. In one embodiment of the present invention, the template or template interface maintains an adjustment for each object associated with one of its regions. In this manner the template itself can be moved, scaled, rotated, sheared, formfitted, or otherwise modified and each object would also be modified in an appropriate manner to maintain the structured chart. This allows the user of the graphics system to modify the overall look of a structured chart by adjusting the template without individually adjusting each object within the template.

Still another technical advantage of the present invention includes a variety of methods that provide an interface between the graphics system and the user. In a particular embodiment, the graphics system allows a user to drag objects in close proximity to the template, and the template responds by selecting, highlighting, or previewing an associated region in which to place the dragged object. The system generates an adjustment that conforms the object to the selected region and displays a newly conformed object in its associated region. This allows a user to quickly and efficiently create a structured diagram.

Yet another technical advantage of the present invention includes an extensible architecture that integrates the template and template methods that form the template interface with a graphics application. The application provides traditional object-based graphical capabilities, while the template interface provides template-based graphical capabilities in accordance with the present invention. In a particular embodiment, the graphics application comprises an executable program and the template interface comprises a dynamic linked library (DLL) registered with the graphics application. Other technical advantages of the present invention are apparent to one skilled in the art in view of the attached figures, description, and claims.

BRIEF DESCRIPTION OF THE DRAWINGS

For a more complete understanding of the present invention, and advantages thereof, reference is now made to the accompanying description taken in conjunction with the accompanying drawings, in which like reference numbers indicate like features and wherein.

DETAILED DESCRIPTION OF THE INVENTION

Figure 1:
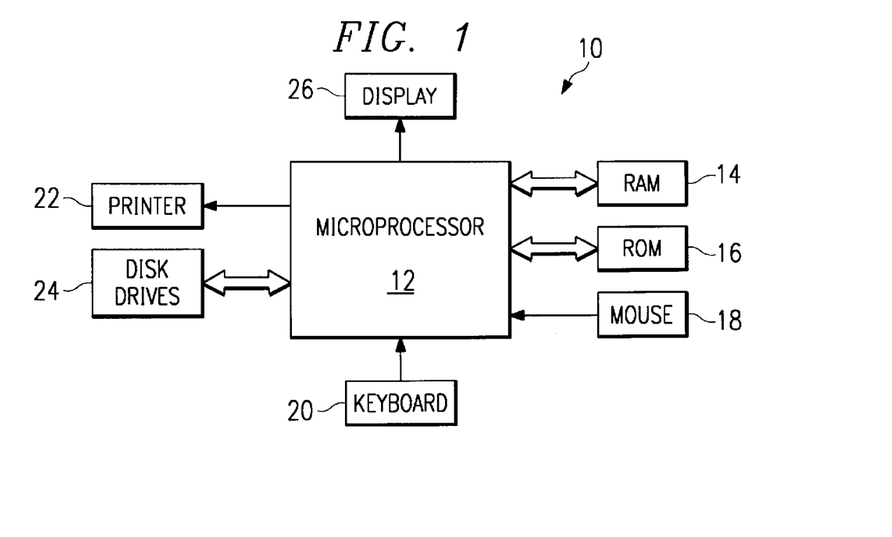
FIG. 1 illustrates a schematic block diagram of a graphics system.

FIG. 1 illustrates a graphics system 10 for implementing the present invention. Graphics system 10 may execute with any of the well-known MS-DOS, PC-DOS, OS-2, MAC-OS, WINDOWS™, UNIX, or other appropriate operating systems. Graphics system 10 includes a microprocessor 12, random access memory (RAM) 14, read-only memory (ROM) 16, CD-ROM, or other appropriate storage and retrieval devices. Input devices include mouse 18, keyboard 20, graphics tablet, joystick, light pen, glove pointing device, or other suitable two-dimensional or three-dimensional input device. Output devices include printer 22, disk drives 24, display 26, plotters, or other suitable two-dimensional or three-dimensional output device.

Graphics system 10 executes a graphics program 28 adapted for implementation in a suitable computer language such as C, C++, or any other appropriate development language. The operation of graphics program 28 is described below in connection with its overall architecture, graphical output, and flowcharts. Those of ordinary skill in the art can readily convert the concepts described below and represented by the architecture, outputs, and flowcharts into executable computer instructions for implementing on graphics system 10.

Generally, graphics system 10 provides several tools that allow a user to quickly and easily create clean and professional looking charts. Charts as defined in this description include flowcharts, process flowcharts, run charts, control charts, cause-and-effect diagrams, figures, diagrams, models, animation, rendering, multimedia presentations, or any other visual collection, arrangement, or coordination of shapes, lines, text, or other visual elements in two or three dimensions. Graphics system 10 may include pixel-based painting tools, model-based drawing tools, multimedia development tools, photographic and video generation and modification tools, or other tools to generate charts. Graphics system 10 provides a flexible and modifiable way to arrange objects in a chart using a template.

Figure 2:
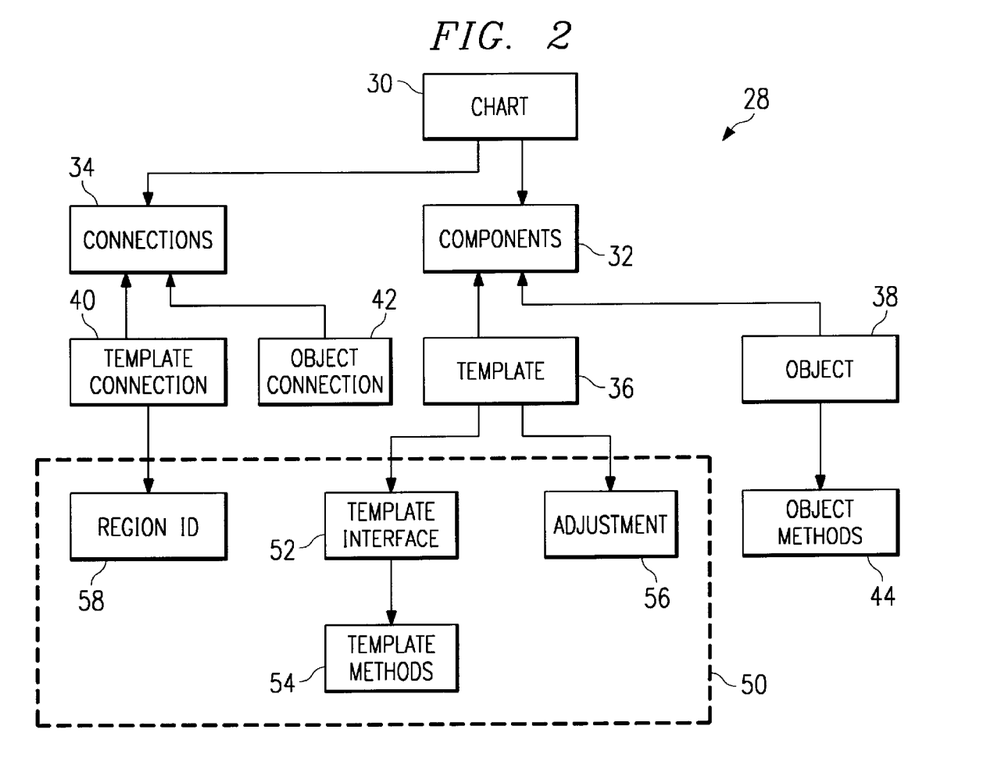
FIG. 2 illustrates components of a graphics program running on the graphics system of FIG. 1.

FIG. 2 illustrates elements of graphics program 28. The description of graphics program 28 references objects, templates, and methods performed on objects and templates that together combine to form a chart 30 for generation and display on graphics system 10. However, it should be understood that graphics system 10 may support the generation and modification of a number of charts 30. Moreover, graphics program 28 may include more or less elements and element interconnections without departing from the spirit and scope of the present invention. It should be understood that each element represented by a single box in FIG. 2 may include additional boxes representing two or more elements.

In the particular embodiment illustrated in FIG. 2, chart 30 includes components 32 and connections 34 between components 32 that together describe and comprise chart 30. Each component 32 is either a template 36 or an object 38. For example, chart 30 may include multiple objects 38 associated with a single template 36. Similarly, each connection 34 is either a template connection 40 or an object connection 42. Templates 36 and objects 38 may comprise lines, shapes, text, and any other suitable visual element, including the style, shading, color, font, or other feature of the component.

Graphics program 28 includes object methods 44 that operate to generate and modify objects 38. For example, object methods 44 include specific methods to: generate squares, rectangles, circles, lines, curved segments, or other geometric features in two or three dimensions; generate textual information; connect or relate different objects; and modify the shape and features of objects 38. In a particular embodiment, objects 38 and object methods 44 are embodied in a module, program, or application of graphics system 28 that provides object-based drawing capabilities. Existing graphics applications may include features to group, combine, and connect objects 38, but they do not provide overall control and flexibility in arranging and coordinating objects 38 in chart 30 using template 26. These existing graphics applications disperse most, if not all, of the information on the structure of chart 30 among objects 38 and object connections 42 that comprise chart 30.

To provide overall control and centralized management of a variety of objects 38 in chart 30, graphics program 28 includes template-based drawing capabilities represented by template module 50. Template module 50 includes a template interface 52 that supports, manages, and performs a number of template methods 54 on template 36. Template methods 54 include methods to: generate templates; modify template boundaries and regions; associate objects 38 to regions of template 36; generate adjustments or transformations to conform objects 38 to regions of template 36; and modify template 36 and its associated objects 38 to provide template level control of chart 30. Template methods 54 are described in more detail below with reference to FIGS. 3A–3C and 7–9.

Template module 50 also includes information generated, maintained, or used by template methods 54. This information includes adjustments 56 that allow graphics program 28 to conform object 38 to associated regions of template 36. These adjustments 56 may include information to move, scale, rotate, shear, formfit or otherwise modify object 38 to conform to an associated region of template 36. One technical advantage of the present invention is the maintenance of adjustments 56 by template 36, which allows graphics program 28 to modify chart 30 by adjusting template 36 without individually adjusting each object 38 in template 36. Template module 50 may also include a region identifier (ID) 58 associated with each template connection 40. Region ID 58 allows template 36 to associate adjustments 56 of objects 38 to regions of template 36.

In a particular embodiment, some or all of the components illustrated in template module 50 may be implemented in an application, module, or program separate from the application, module, or program that supports generation and modification of objects 38. For example, a dynamic linked library (DLL) may be implemented with template interface 52 to provide an extensible architecture in graphics program 28. This allows graphics program 28 to supplement in a modular fashion different templates 36 and their associated template methods 54.

Figure 3A:
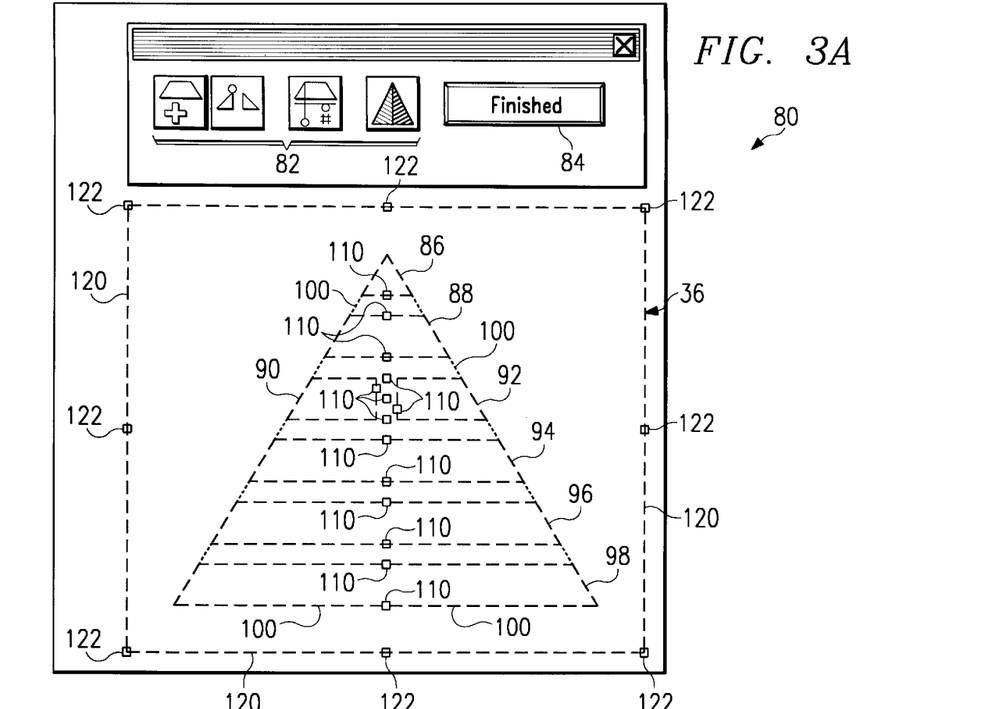
FIGS. 3A–3C illustrate the interaction between a template and objects in a chart generated by the graphics system.
Figure 3B:
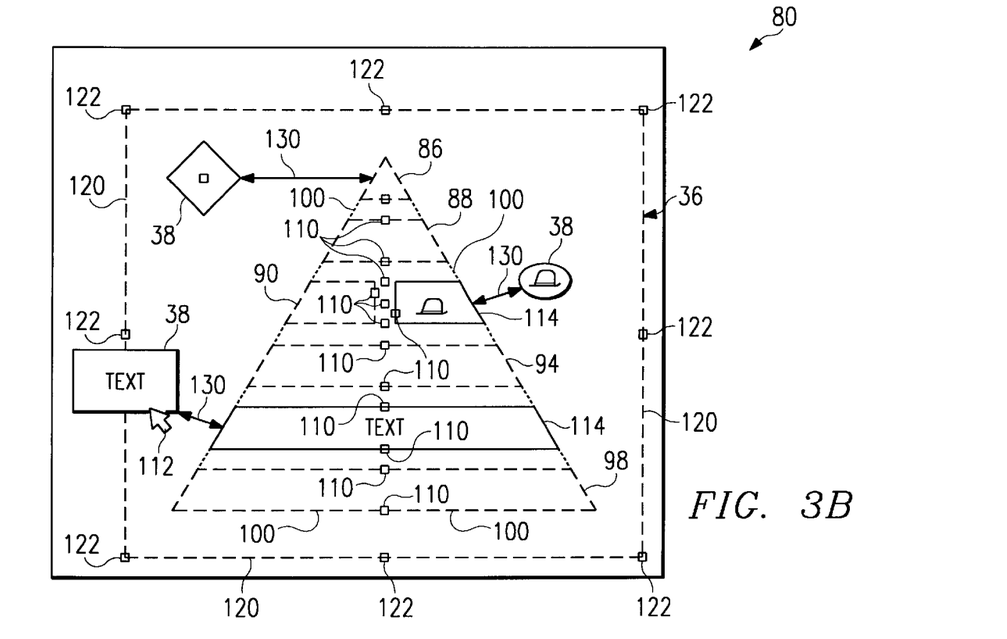
Figure 3C:
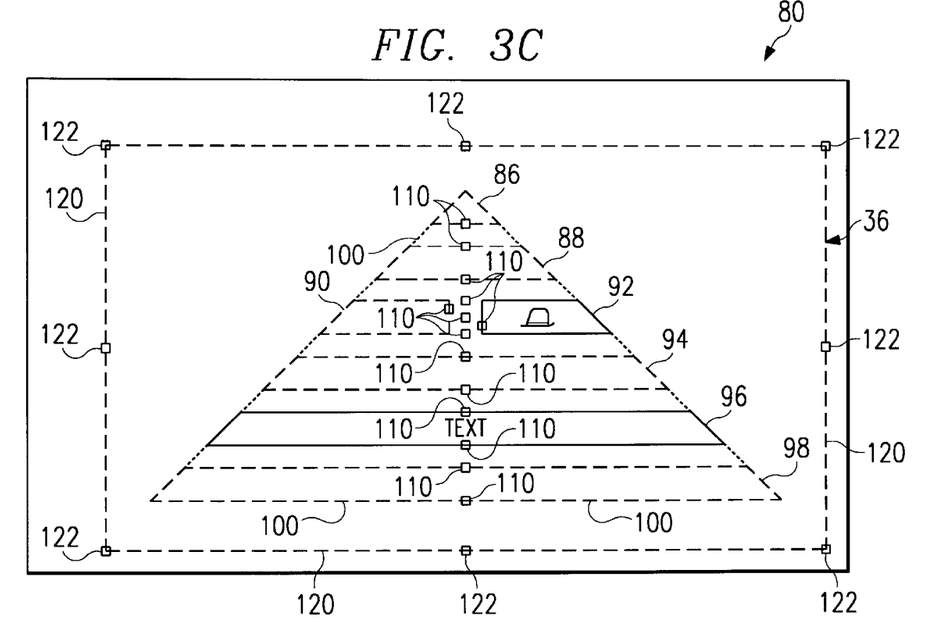

FIGS. 3A–3C illustrate the operation of template methods 54 on an exemplary pyramid template 36. FIG. 3A illustrates the creation of template 36 and subsequent modification in an edit mode. FIG. 3B illustrates the methods to associate objects 38 with template 36. FIG. 3C illustrates the modification of template 36 and its associated objects 38 to provide template level control of chart 30.

Now referring to FIG. 3A, graphics program 28 presents a template menu 80 that includes several template icons 82 and action icons 84. Template icons 82 represent different templates 36 supported by graphics program 28, and when activated, create the selected template 36. Actions icons 84 represent activities supported by graphics program 28 during edit mode. For example, activating a finished action icon 84 causes graphics program 28 to exit edit mode.

Upon user selection of one of the supported templates using template icon 82, graphics program 28 presents template 36 for editing and modification. Template 36 includes a number of regions 86–98 (referred to generally as regions 86) that define areas in which an associated object 38 may be displayed. Each region 86 may be defined by a combination of a boundary 100 of template 36 and internal boundaries (e.g., horizontal and vertical lines) within boundary 100 of template 36. For example, region 86 comprises a triangle formed of two sides coincident with boundary 100 of template 36 and a third side formed by an internal horizontal line. Similarly, region 98 comprises a trapezoid defined on three sides by boundary 100 of template 36 and on its fourth side by an internal horizontal line within template 36. Region 90 has a first side defined by boundary 100, second and third sides defined by internal horizontal lines, and a fourth side defined by an internal vertical line.

While the features and functions of template 36 are described with reference to an exemplary pyramid structure, it should be understood that the present invention contemplates any shape or structure of template 36 and its associated regions 86 that allow a structured arrangement of objects 38. In a particular embodiment, boundary 100 of template 36 comprises a non-rectangular shape that includes curved segments, lines that are neither horizontal nor vertical, or both. Therefore, the shape of template 36 allows objects 38 in chart 30 to be arranged and configured in accordance with guides that are not limited to orthogonal coordinate systems.

Each region 86 may include region control points 110 that allow a user to adjust the shape of regions 86. For example, region 86 includes a single control point 110 associated with its internal horizontal line that allows vertical adjustment of this horizontal line to change the shape of region 86. Similarly, region 88 includes two region control points 110 associated with its two horizontal lines for adjusting the shape of region 88. Moreover, regions 86 may include region control points 110, such as shown in regions 90 and 92, that allow more degrees of freedom in adjusting the associated region. As region control point 110 moves, the boundaries of region 86 defined by boundary 100 of template 36 adjust accordingly. For example, if region control point 110 of region 86 moves downward, the two sides of region 86 defined by portions of boundary 100 of template 36 extend to accommodate the larger shape. Therefore, region control points 110 provide any number of adjustments, modifications, or deletions of lines or curves internal to template 36 that define the boundaries of regions 86.

In edit mode, template 36 also includes an edit frame 120 having template control points 122 that allow adjustment of boundary 100. For example, template control points 122 in the corners of edit frame 120 may allow expansion or contraction of template 36 along two axes, whereas template control points 122 along the edges of edit frame 120 may allow expansion or contraction of template 36 along a single axis. In addition, edit frame 120 allows movement of template 36 without modification of the shape of boundary 100.

With the combination of region control points 110 and template control points 122, a user can modify template 36 to accommodate any number and shape of regions 86 and any desired overall shape of template 36. In a particular embodiment, region control points 110, edit frame 120, and template control points 122 are presented during an edit mode in combination with template menu 80. Upon completion of desired modifications to template 36, the user can indicate a desire to leave edit mode by activating finished action icon 84. Upon exiting edit mode as illustrated in FIG. 3A, graphics program 28 provides methods to associate objects 38 with template 36 as described below.

FIG. 3B illustrates template methods 54 that associate objects 38 with template 36. To associate object 38 with a selected region 86 in template 36, a user invokes a movement method to move object 38 with respect to template 36. This may be accomplished by grabbing or selecting object 38 with a pointer 112 and dragging object 38 and pointer 112 towards template 36. When object 38 moves to within a certain proximity or predetermined distance 130 of template 36, graphics program 28 highlights, selects, or previews a selected region 96 to indicate to the user the option of placing object 38 into region 96. In one embodiment, graphics program 28 highlights region 96 and object 38 remains outside of template 36. In another embodiment, graphics program 28 visually previews how object 38 conforms to region 96.

If graphics program 28 detects a user input indicating a desire to place object 38 in region 96, such as through the release of a button on mouse 18, graphics program 28 erases the original visual representation of object 38 and displays the visual representation of a conformed object 114 in region 96. Additional movement of pointer 112 and object 38 over template 36 may highlight and optionally display conformed object 114 in various regions 86 of template 36. Graphics program 28 repeats this procedure of dragging and dropping objects 38 to arrange conformed objects 114 within selected regions 86 of template 36.

FIG. 3C illustrates template methods 54 that allow modification of the size and shape of template 36 having conformed objects 114 in one or more regions 86. Upon selecting template 36 with mouse 18 or otherwise invoking an edit mode as described with reference to FIG. 3A, graphics program 28 presents the user with edit frame 120 and associated template control points 122 that allow modification of the overall size, shape, or position of template 36. In this embodiment, template 36 already has conformed objects 114 placed in regions 86, therefore graphics program 28 must adjust not only template 36 but all conformed objects 114 in regions 86. This provides a significant technical advantage since the user can globally modify an arrangement of objects without the time-consuming and inaccurate modification of individual objects. The centralized control of chart 30 offered by template 36 allows users to maintain a hierarchical order of chart 30. The present invention contemplates grouping and arranging multiple objects within template 36, as well as grouping and arranging of several templates 36 in a higher level template. Graphics program 28 supports multiple nesting levels of templates 36 and objects 38.

In the particular embodiment of FIG. 3C, graphics program 28 modifies boundary 100 of template 36 in response to a movement of template control point 122 in the upper right-hand corner of edit frame 120. As illustrated, template control point 122 moves down to shrink template 36 in the vertical direction and to the right to expand template 36 in the horizontal direction. Regions 86 and any conformed objects 114 associated with regions 86 undergo a similar transformation to accommodate the new boundary 100 of template 36. The adjustments to conformed objects 114 occurs automatically in response to a modification to template 36.

Figure 4A:
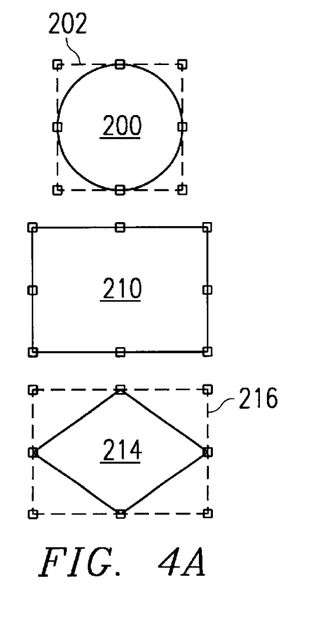
FIGS. 4A and 4B illustrate techniques to conform objects to regions of the template.
Figure 4B:
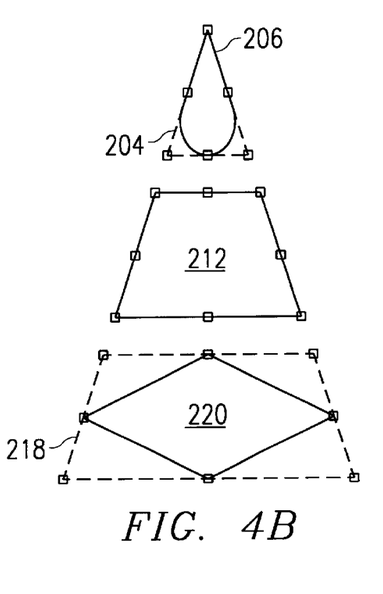

FIG. 4A illustrates different techniques to conform objects 38 to regions 86 and template 36. Generally, graphics program 28 conforms objects 38 to regions 86 by moving, scaling, rotating, shearing, formfitting, or otherwise modifying object 38. This may be accomplished by defining particular points, splines, curved or line segments, or other components of objects 38 to conform to the boundaries of region 86. Also, graphics program 28 may use an edit frame, like edit frame 120 of template 36, to conform object 38 to its associated region 86, as described below.

A circle 200 has an associated edit frame 202. When conformed to region 204 in template 36, a conformed circle 206 resembles a teardrop. Graphics program 28 may perform this transformation by conforming or matching edit frame 202 to region 204. In this particular example, graphics program 28 moves the upper two corners of edit frame 202 together at a position directly above circle 200 and stretches edit frame 202 to form a teardrop or conformed circle 206. The information generated by graphics program 28 to adjust edit frame 202 comprises adjustment 56 associated with circle 200.

A rectangle 210 may have an edit frame that is coincident with the boundaries of rectangle 210. When conformed to region 212 of template 36, conformed rectangle 212 takes the precise shape of its associated region. Again, the transformation from rectangle 210 to conformed rectangle 212 may be conceptualized as an adjustment in the shape of rectangle 210 using its associated edit frame. A diamond 214 has an associated edit frame 216. To conform diamond 214 to region 218, graphics program 28 adjusts edit frame 216 to be coincident with the boundaries of region 218. The resulting conformed diamond 220 stretches in one or two dimensions to conform to region 218.

Figure 5:
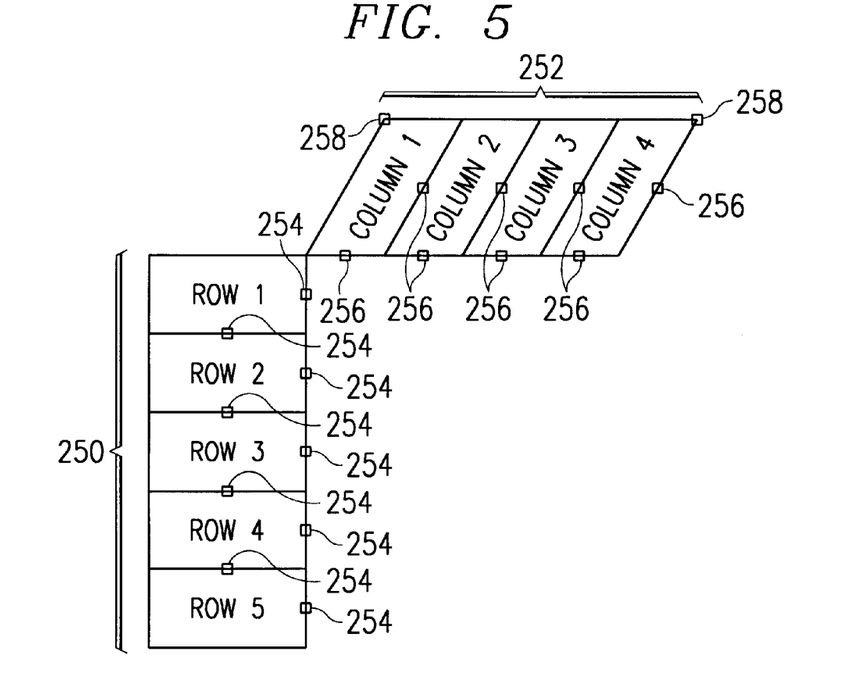
FIG. 5 illustrates another embodiment of a chart generated by the graphics system.

FIG. 5 illustrates template 36 having shear and text rotation features. In this example, template 36 includes several regions 250 associated with textual objects that include row labels and several regions 252 associated with textual objects that include column labels. Regions 250 include region control points 254 that adjust regions 250. In this example, adjustments to regions 250 do not alter their generally rectangular shape. Regions 252 also include region control points 256 that adjust the general size of regions 252. In addition, region control points 258 provide an additional text rotation and shearing adjustment to regions 252 and their associated objects. For example, region control point 258 moving in a generally arcuate fashion changes the angular orientation of textual information contained in objects associated with regions 252. In combination with this textual rotation, graphics program 28 automatically reshapes the textual objects to conform to regions 252. This may be accomplished by a variety of shearing, filling, or other functions.

Figure 6:
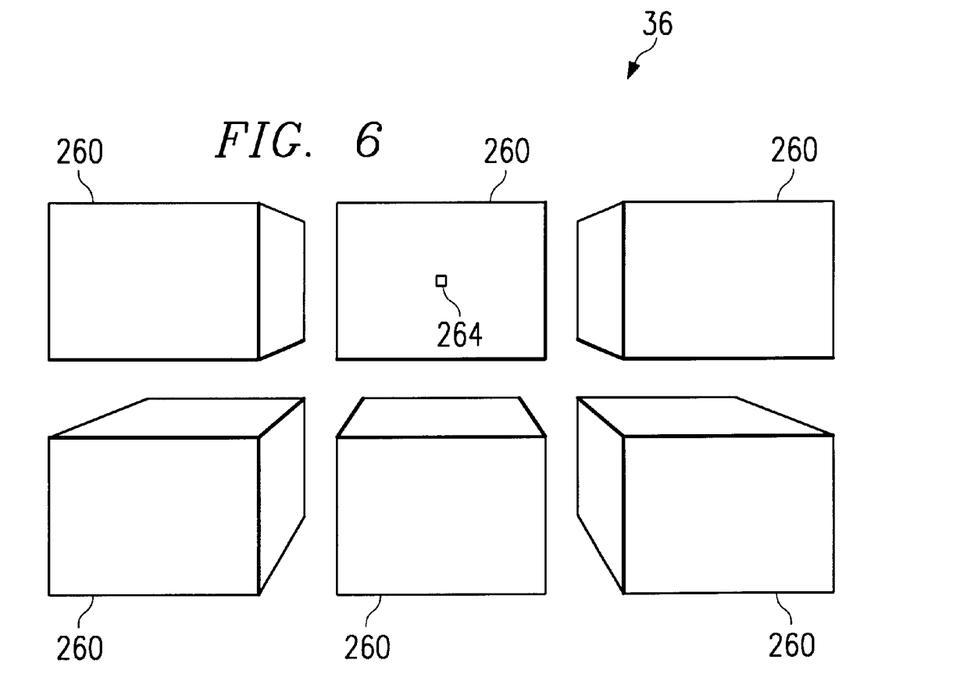
FIG. 6 illustrates yet another embodiment of a chart generated by the graphics system.

FIG. 6 illustrates yet another embodiment of template 36 that includes a number of three-dimensional boxes 260 arranged in a checkerboard fashion. Template 36 may include region control points 262, as well as a vanishing point 264 that governs the three-dimensional extrusion of each object 260. Movement of vanishing point 264 causes graphics program 28 to adjust the three-dimensional extrusion of objects 260 associated with template 36.

Figure 7:
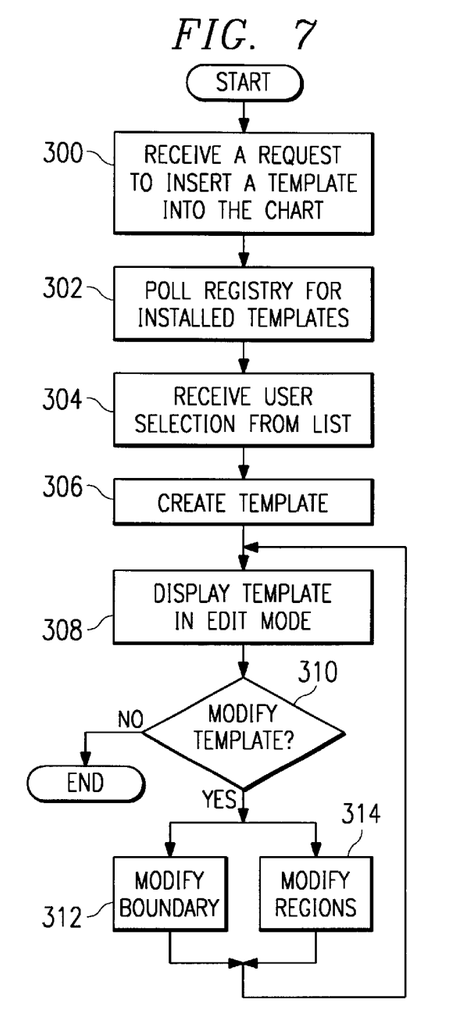
FIG. 7 illustrates a flowchart for generating and modifying a template.

FIG. 7 is a flowchart of template methods 54 described above with reference to FIG. 3A. The method begins at step 300 where graphics program 28 receives a request to insert template 36 into chart 30. Program 28 then polls its environment, such as a WINDOWS registry, to determine installed templates 36 that the user can select at step 302. For example, if graphics program 28 implements all or a portion of template module 50 as a dynamic linked library (DLL), then upon initiation of graphics program 28, each appropriate template DLL may be registered and made available to the user. This extensible architecture allows graphics program 28 to deliver different templates 36, template interfaces 52, and template methods 54 in a modular and upgradable fashion. Graphics program 28 receives a user selection of an available template 36 at step 304 using, for example, a signal generated by a selection of template icon 82 in edit menu 80.

Graphics program 28 creates template 36 at step 306 and displays template 36 in edit mode at step 308. As described above with reference to FIG. 3A, graphics program 28 displays template 36 and its associated regions 86 with region control points 110, edit frame 120, and template control points 122. If the user desires to modify template 36 at step 310, then graphics program 28 supports two primary modifications. Graphics program 28 can modify boundary 100 of template 36 in response to movement of edit frame 120 or template control points 122 at step 312. Also, graphics program 28 can modify regions 86 of template 36 in response to movement of region control points 110 at step 314. Upon modifying template 36 at step 312 or regions 86 at step 314, graphics program 28 displays modified template 36 in edit mode at step 308. If the user indicates that no modifications are necessary or that modifications are complete by activating control icon 84, for example, then the method ends.

Figure 8:
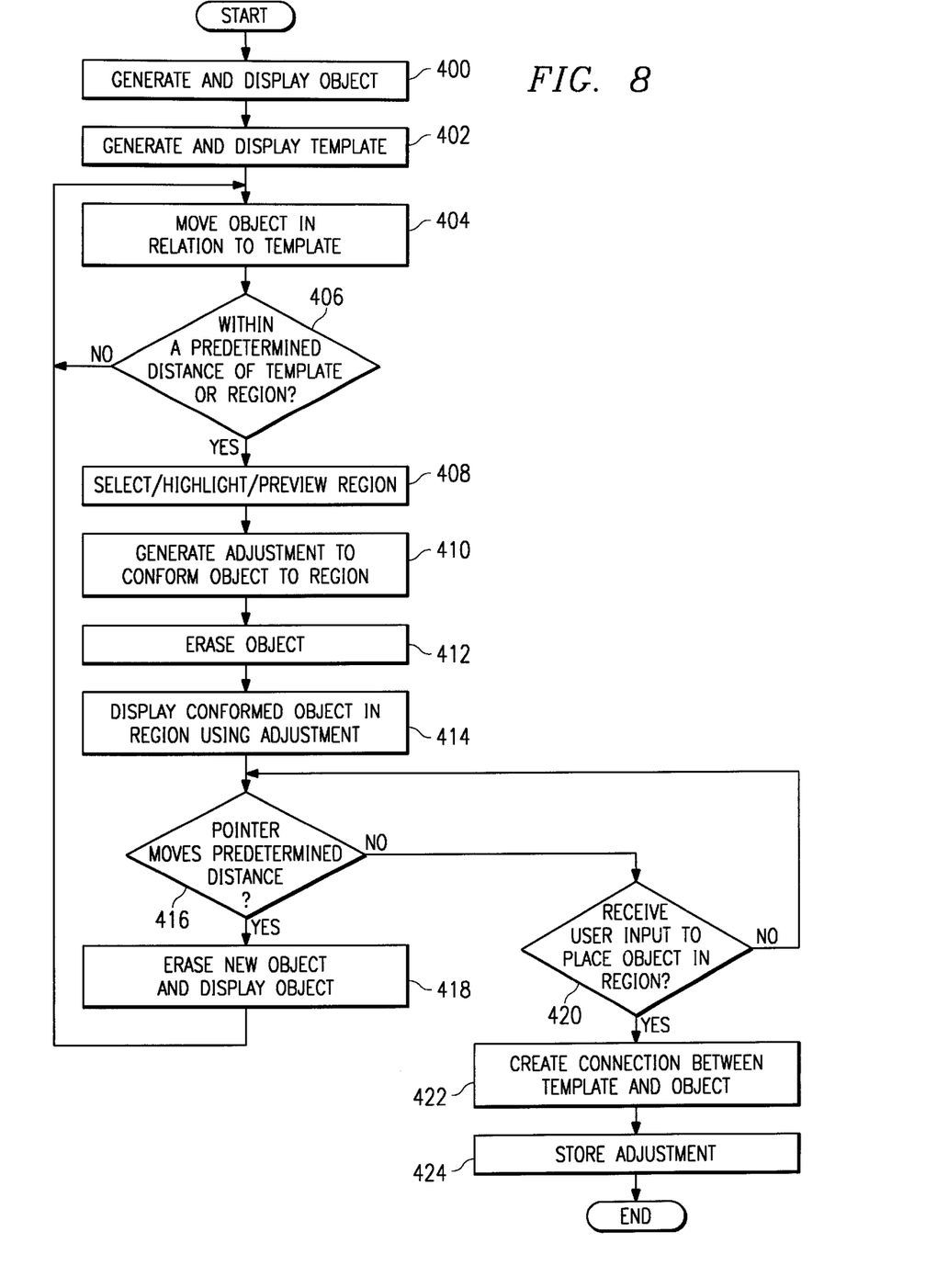
FIG. 8 illustrates a flowchart for associating objects with the template.

FIG. 8 illustrates a flowchart of template methods 54 described above with reference to FIG. 3B. The method begins at step 400 where graphics program 28 generates and displays objects 38. As described above, this may be accomplished by a drawing program that supports traditional object-based graphical capabilities. Graphics program 28 generates and displays template 36 at step 402 in accordance with the procedure described above with reference to FIG. 7. At this point, graphics system 10 displays template 36 and a variety of objects 38 that have yet to be associated with template 36 on display 26.

To associate object 38 with template 36, graphics program 28 moves object 38 in relation to template 36 in response to signals generated by mouse 18 or other input device at step 404. If object 38 is within a certain proximity or predetermined distance 130 of template 36 or region 86 within template 36 at step 406, then graphics program 28 selects, highlights, or previews associated region 86 at step 408. Graphics program 28 then generates adjustment 56 to conform object 38 to region 86 at step 410. Adjustment 56 comprises information that specifies any movement, scaling, rotation, shearing, formfitting, or other adjustment to conform object 38 to the confines or boundary of region 86.

In a particular embodiment of graphics system 10, graphics program 28 erases the visual representation of object 38 at step 412 and displays the visual representation of conformed object 114 in region 86 using adjustment 56 at step 414. If pointer 112 moves a predetermined distance away from region 86 at step 416, graphics program 28 erases the visual representation of conformed object 114 and redisplays the visual representation of object 38 in the position indicated by pointer 112 at step 418. Alternatively, a movement of pointer 112 may cause object 38 to conform to a new region 86 in template 36. Graphics program 28 supports successive steps to drop object 38 in regions 86 and pull conformed object 114 out of regions 86 as pointer 112 moves across template 36.

Graphics program 28 then waits for confirmation from the user that it desires to associate object 38 or conformed object 114 with its associated region 86. Graphics program 28 may detect this user input by a button up condition on mouse 18 or other appropriate signal at step 420. If confirmation is received to place object 38 in region 86 at step 420, graphics program 28 creates template connection 40 that associates region 86 of template 36 to object 38 using region ID 58 at step 422. Also, if appropriate, graphics program 28 stores adjustment 56 associated with object 38 at step 424.

Figure 9:
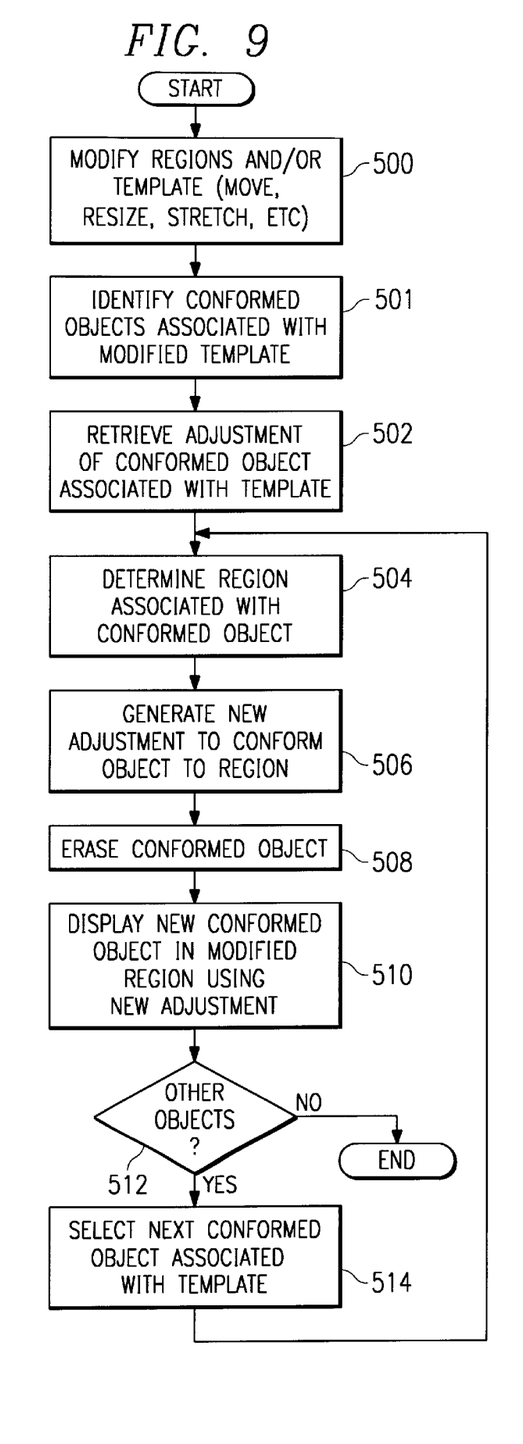
FIG. 9 illustrates a flowchart for modifying a template having associated objects.

FIG. 9 is a flowchart of template methods 54 described above with reference to FIG. 3C. The process begins at step 500 where graphics program 28 modifies regions 86, template 36, or both, using region control points 110, edit frame 120, or template control points 122. Graphics program 28 performs the modifications at step 500 during an edit mode similar to the one described above with reference to FIG. 3A. Modifications to template 36 indirectly and regions 86 directly affect the size, position, and shape of regions 86, which necessitates a readjustment of each conformed object 114 in template 36.

In response to modifications at step 500, graphics program 28 identifies conformed objects 114 having a template connection 40 specifying template 36 at step 501. Graphics program 28 then retrieves adjustment 56 of one of the conformed objects 114 associated with template 36 at step 502. Graphics program 28 then determines region 86 associated with conformed object 114 region ID 58 at step 504. Graphics program 28 then generates a new adjustment 56 to conform object 38 or conformed object 114 to region 86. It should be understood that graphics program 28 may use graphics data or other information specified by adjustment 56, object 38, or conformed object 114 to generate new adjustment 56.

Graphics program 28 erases the visual representation of conformed object 114 at step 508 and displays the visual representation of new conformed object 114 in modified region 86 using new adjustment 56 at step 510. If template 36 includes other objects that need adjustment at step 512, then graphics program 28 selects the next conformed object 114 associated with template 36 at step 514 and repeats steps 504–510 to make the object adjustment.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A computer graphics program embodied in a computer-readable medium for executing the following steps:

displaying a template having a boundary and a plurality of regions;

displaying an object that can be associated with the template;

moving the object with respect to the template in response to a user command;

detecting the proximity of the object to a region of the template; and simultaneously displaying the object in the region using an adjustment that changes the shape or size of the object and in the proximity of the region without using an adjustment while the object is detected in the proximity of the region.

2. The graphics program of claim 1, further comprising the steps of:

detecting a user input indicating a desire to place the object in the region; and erasing the display of the object in the proximity of the region in response to the user input.

3. The graphics program of claim 1, further comprising the step of modifying one of the regions in response to movement of a region control point located within the boundary of the template.

4. The graphics program of claim 3, further comprising the step of conforming an object associated with the region in response to the modification to the region.

5. The graphics program of claim 1, further comprising the step of modifying the template and the regions in response to movement of a two axes template control point.

6. A computer graphics program embodied in a computer-readable medium for executing the following steps:

displaying a template having a boundary and a plurality of regions located within the boundary;

displaying an object located within and conforming to an associated region; and modifying the template and the regions in response to movement of a two axes template control point.

7. The graphics program of claim 6, further comprising the step of conforming the object associated with the region in response to the modification to the region.

8. The graphics program of claim 6, further comprising the steps of:

displaying an object that can be associated with the template;

moving the object with respect to the template in response to a user command;

detecting the proximity of the object to a region of the template; and displaying the object in the region using an adjustment while the object is detected in the proximity of the region.

9. The graphics program of claim 8, further comprising the step of displaying the object in the proximity of the region without using an adjustment while the object is detected in the proximity of the region.

10. A computer graphics program embodied in a computer-readable medium and operable to execute on a computer having a display, the graphics program comprising:

a graphics application operable to generate a plurality of objects; and a template module, separate from and accessible by the graphics application, comprising a template interface and at least one template method to generate a template having a boundary and a plurality of regions located within the boundary.

11. The graphics program of claim 10, wherein:

the template module includes a template method to generate an adjustment to conform an object generated by the application to an associated region of the template; and the template module retains the adjustment generated by the template method to conform the object to the associated region of the template.

12. The graphics program of claim 10, wherein the graphics program can modify a chart comprised of a template, a plurality of regions located within the boundary of the template, and at least one object associated with one of the regions in response to a user adjustment to the template by adjusting the template, the regions, and the object.

13. The graphics program of claim 10, wherein:

the template module includes a template method to generate an adjustment to conform an object generated by the application to an associated region of the template; and the application displays the object in the associated region of the template using the adjustment.

14. The graphics program of claim 10, wherein the template module maintains a region identifier to associate each object to an associated region of the template.

15. The graphics program of claim 10, wherein the application comprises an executable file and the template module comprises a dynamic linked library.

16. The graphics program of claim 10, further comprising:
a movement method operable to move an object with respect to the template in response to a user command;
a detection method operable to detect the proximity of the object to a region of the template; and
a highlighting method operable to highlight the region to which the proximity of the object was detected while the object is detected in the proximity of the region.

17. The graphics program of claim 16, further comprising:
a detection method operable to detect a user input indicating a desire to place the object in the region;
an erasure method operable to erase the display of the object in the proximity of the region in response to the user input; and
a display method operable to display the object in the region with an adjustment.

18. The graphics program of claim 16, further comprising a display method operable to display the object in the region using an adjustment while the object is detected in the proximity of the region.

19. The graphics program of claim 18, wherein the object is simultaneously displayed in the proximity of the region without using an adjustment while the object is detected in the proximity of the region.

20. The graphics program of claim 10, further comprising a modification method operable to modify the shape of a region in response to movement of a region control point located within the boundary of the template.

21. The graphics program of claim 10, further comprising a modification method operable to modify the template and the regions in response to movement of a two axes template control point.

* * * * *